United States Patent [19]

Morgan et al.

[11] 4,343,478
[45] Aug. 10, 1982

[54] FACE SEAL ASSEMBLY FOR ROTATING DRUM

[75] Inventors: J. Giles Morgan; Mark J. Rennich, both of Knoxville; Marvin E. Whatley, Oak Ridge, all of Tenn.

[73] Assignee: The United States of America as represented by the United States Department of Energy, Washington, D.C.

[21] Appl. No.: 243,395

[22] Filed: Mar. 13, 1981

[51] Int. Cl.³ ............................................. F16J 15/36
[52] U.S. Cl. .......................................... 277/90; 277/86
[58] Field of Search .................................. 277/82-90, 277/200, 81 R

[56] References Cited

U.S. PATENT DOCUMENTS 2,743,121 4/1956 Stevens ............................. 277/90 X
3,462,160 8/1969 Adams ................................. 277/88
3,764,150 10/1973 Newkirk ............................. 277/90
4,199,155 4/1980 Day et al. ............................ 277/88
4,209,175 6/1980 Bliemeister ......................... 277/84

FOREIGN PATENT DOCUMENTS 281207 12/1927 United Kingdom ................. 277/90

Primary Examiner—Robert S. Ward, Jr.
Attorney, Agent, or Firm—Edwin D. Grant; Stephen D. Hamel; Richard G. Besha

[57] ABSTRACT

A seal assembly comprises a tube rotatable about its longitudinal axis and having two longitudinally spaced flanges projecting radially outwardly from the outer surface thereof. Slidably positioned against one of the flanges is a seal ring, and disposed between this seal ring and the other flange are two rings that are forced apart by springs, one of the latter rings being attached to a flexible wall.

11 Claims, 3 Drawing Figures

FACE SEAL ASSEMBLY FOR ROTATING DRUM

BACKGROUND OF THE INVENTION

This invention, which resulted from a contract with the United States Department of Energy, relates to a seal means and, more particularly, to a seal assembly for chemical process apparatus.

In the reprocessing of spent nuclear fuel, tritium is separated from other fuel components in an initial process step wherein the disintegrated fuel elements are subjected to an oxidizing atmosphere in a continuous flow, rotary calcining furnace. It is essential to provide effective seals for the inlet and outlet ends of the rotating drum of this calcining furnace. The conditions under which seals for this purpose must operate and maintain integrity are (1) intense radiation, (2) a dusty atmosphere, (3) a pressure differential across the seals of up to 5 inches of water, (4) a temperature of about 200° F., and (5) minor misalignment and shifting between the calcining drum and the inlet and outlet structures associated therewith.

SUMMARY OF THE INVENTION

It is therefore a primary object of this invention to provide an improved means for sealing a junction between an end of a rotary calcining drum of the type described and a casing placed around the drum.

Another object of the invention is to provide an effective seal assembly, the components of which can be conveniently disassembled for replacement or servicing.

These objects are attained by a preferred embodiment of the invention comprising a graphite seal ring concentrically positioned around a rotary calcining drum adjacent one end thereof, this ring slidably abutting one side of a flange fixed to the periphery of the drum. A second flange is fixed to the drum in spaced relation with the first-mentioned flange and the graphite seal ring is held firmly against the latter by compressed springs acting against (1) a thrust ring which abuts the seal ring and (2) another thrust ring provided with graphite pads which abut the second flange.

DETAILED DESCRIPTION OF THE PREFERRED EMBODIMENT

Figure 1:
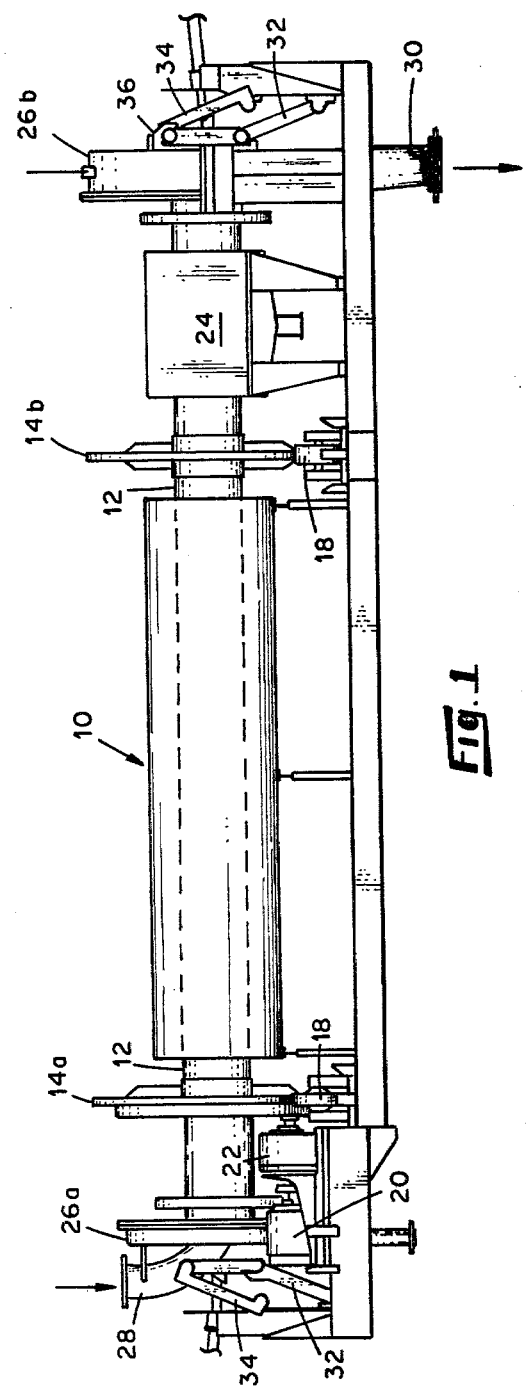
FIG. 1 is a side elevation view of a rotating drum nuclear fuel calcining apparatus in which seal assemblies constructed in accordance with the invention are advantageously employed.

As illustrated in FIG. 1, a calcining furnace 10 used for processing spent nuclear fuel comprises a drum or tube 12 centrally mounted in wheels 14a, 14b that rest on support rollers 18, the tube being rotated about its longitudinal axis by a drive motor 20 connected to wheel 14a through a gear box 22. Tube 12 extends through a cooling chamber 24, and each end of the tube extends into a casing 26a, 26b. A conduit 28 feeds spent nuclear fuel to tube 12 through casing 26a, and the calcined fuel is discharged from the tube into another conduit 30 connected to casing 26b. Each casing 26a, 26b can be retracted from the end of tube 12 associated therewith by swinging movement of support arms 32, the support arms for casing 26a being pivoted to a frame 34 that is fixed to the conduit 28 attached to this casing and the support arms for casing 26b being pivoted to brackets 36 mounted thereon.

Figure 2:
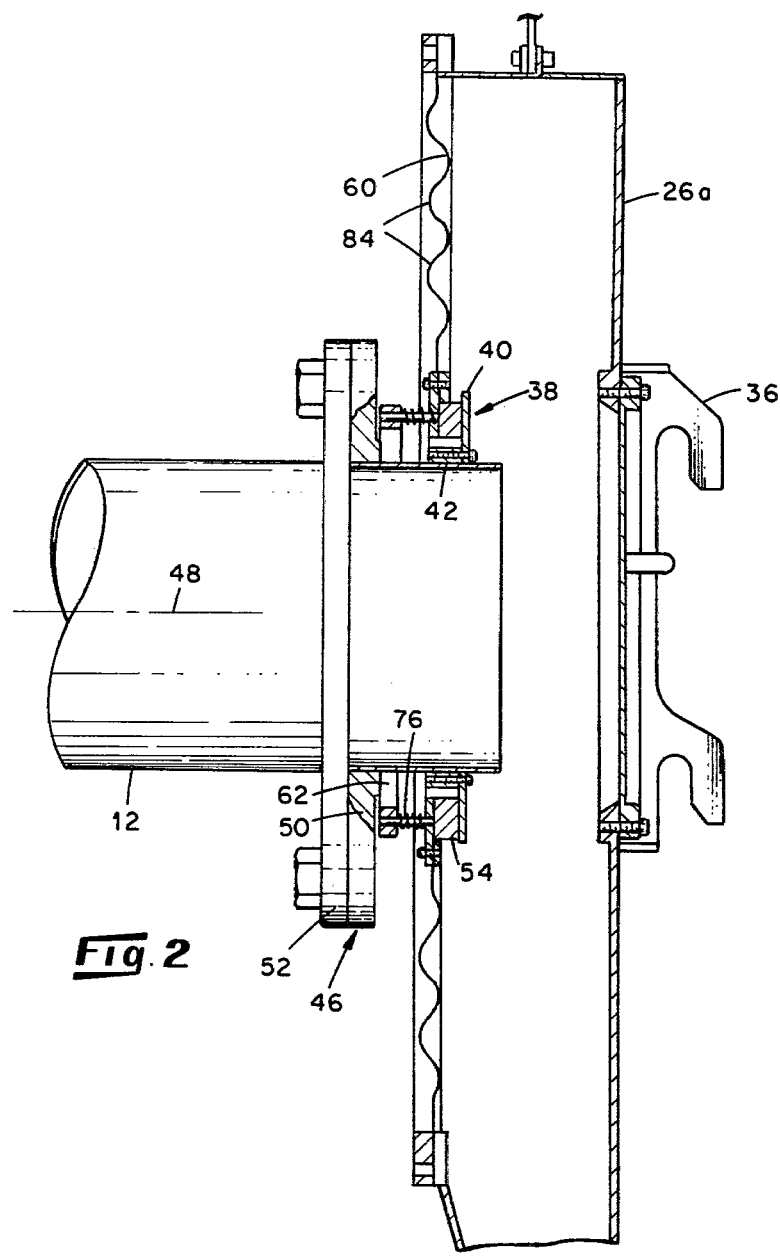
FIG. 2 is a view of a portion of the calcining drum illustrated in FIG. 1, with a casing which surrounds the drum at one end thereof and components of the preferred seal assembly of the invention being represented in cross section along a vertical plane including the longitudinal axis of the drum.
Figure 3:
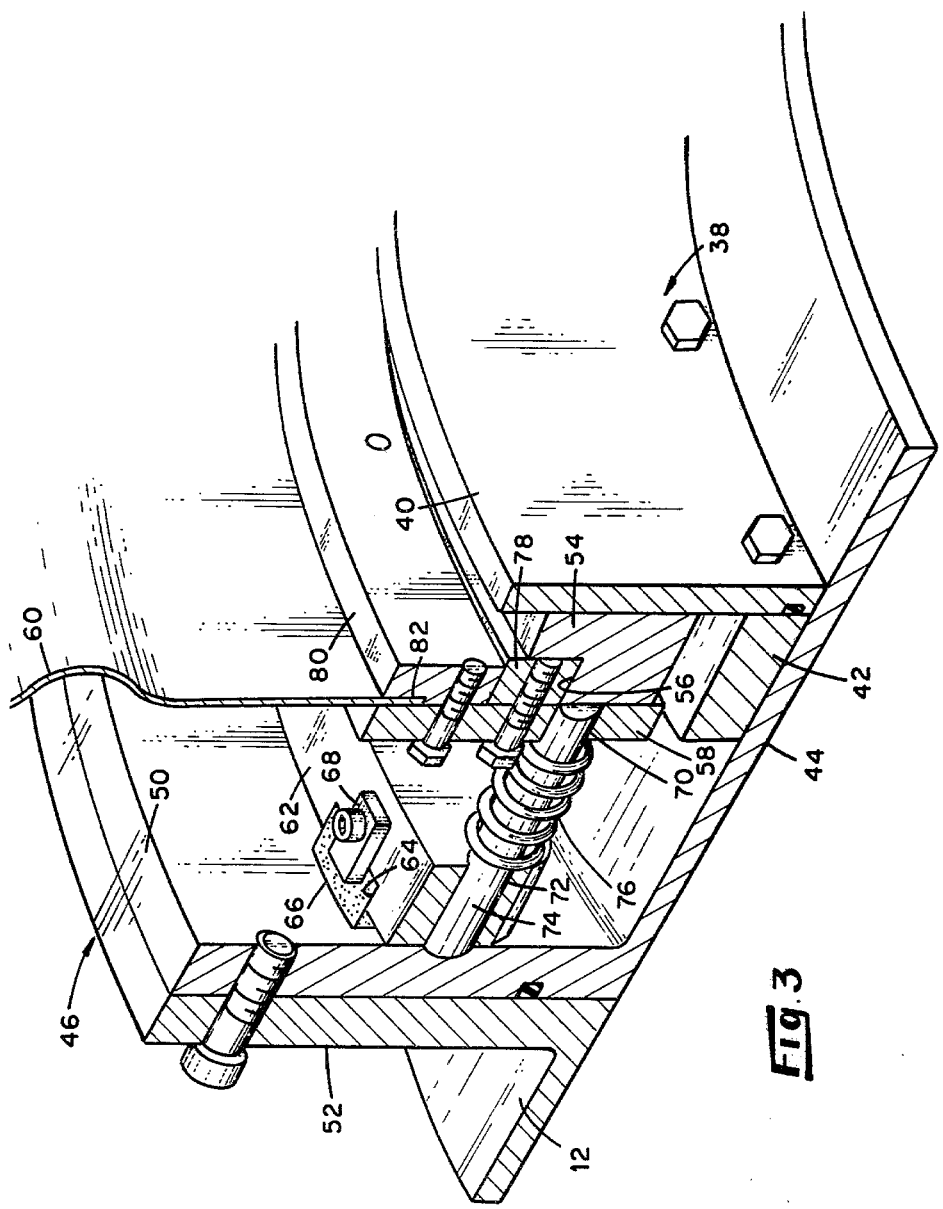
FIG. 3 is a pictorial view of portions of the preferred seal assembly.

FIGS. 2 and 3 illustrate the seal assembly of this invention used for sealing the opening in casing 26b through which tube 12 extends. The same seal structure is used to seal the opening in casing 26a through which the other end of tube 12 extends, and it can also be used with other rotating members such as drive shafts. Reference number 38 generally designates a first flange consisting of a washer-shaped ring 40 bolted to a mounting ring 42 fixed to an end segment 44 of tube 12 by any suitable means, such as welding. Reference number 46 generally designates a second flange that is spaced from first flange 38 longitudinally of the axis of tube 12, this flange consisting of a flange portion 50 integrally formed on end segment 44 of the tube and another flange portion 52 integrally formed on the main section of the tube and bolted to the flange portion 50.

One side of a first graphite ring 54 slidably abuts the side of first flange 38 nearest second flange 46; the other side of this ring has a recess 56 extending around the outer edge thereof. A second ring 58 abuts the side of first ring 54 nearest second flange 46 and projects radially outward therefrom to facilitate its attachment to a wall 60 of housing 26b.

A third ring 62 is disposed adjacent the side of second flange 46 nearest first flange 38, this ring having a plurality of recesses 64 (only one of these recesses being illustrated, in FIG. 3) spaced apart from one another about the side thereof which faces the second flange. A plurality of friction-reducing pads 66 are respectively seated in recesses 64 and project therefrom into engagement with the confronting side of flange portion 50 of second flange 46, plates 68 being bolted to the inner and outer edges of ring 62 to hold the pads in the recesses.

Circumferentially spaced about both second ring 58 and third ring 62 are a plurality of apertures 70, 72 the longitudinal axes of which are parallel with the longitudinal axis 48 of tube 12. Apertures 70, 72 are arranged with the same circumferential spacing on rings 58, 62 so that the ends of a positioning pin 74 can be slidably disposed in each aligned pair of these apertures. A helical spring 76 is disposed around each positioning pin with its ends respectively abutting the confronting sides of second ring 58 and third ring 62.

A fourth ring 78, formed of a steel alloy having a low coefficient of thermal expansion (such as the alloy sold under the trademark Invar), is press fitted into the recess 56 in first ring 54 and secured to second ring 58 by bolts. A fifth ring 80 is positioned in abutting relation around fourth ring 78 and attached by bolts to second ring 58. Wall 60 of casing 26a has an aperture formed therein, and the portion 82 of this wall adjacent the aperture is clamped between second ring 58 and fifth ring 80. As can be seen in FIG. 2, concentric corrugations 84 are formed in wall 60 to increase its flexibility in both radial and longitudinal directions relative to the axis 48 of tube 12.

It will be understood from the above description that springs 76 placed under compression between second ring 58 and third ring 62 urge these rings apart and thereby hold seal ring 54 firmly against flange 38 which rotates with tube 12. In the nuclear fuel calcining apparatus illustrated in FIG. 1, tube 12 has a diameter of 18 inches, and twelve springs 76 exerting a total force of 300 pounds are placed between rings 58 and 62. Ring 54 has a two-inch wide bearing face and its combination with the other components of the seal assembly in the manner described has been found to provide an effective seal under the operating conditions listed hereinbefore. The arrangement of the assembly accommodates both angular and translational shifting of tube 12 relative to casings 26a, 26b, and friction between the assembly and flanges 38, 46 is minimized by the use of graphite for forming seal ring 54 and pads 66. Lastly, the disclosed seal assembly can conveniently be fabricated, installed, and serviced.

What is claimed is:

1. An assembly comprising:
    rotatable means having first and second surfaces projecting radially from and extending circumferentially of the axis of rotation thereof, said surfaces being spaced apart longitudinally of said axis;
    a first ring one side of which abuts said first surface of said rotatable means;
    a second ring abutting the other side of said first ring;
    a flexible wall having an aperture therein, the portion of said wall adjacent said aperture being attached to said second ring and said wall projecting radially away from the axis of rotation of said rotatable means;
    a third ring disposed between said second ring and said second surface of said rotatable means; and
    means disposed between said second and third rings for urging them apart.

2. The assembly of claim 1 wherein said means for urging said second and third rings apart comprises a plurality of helical springs spaced apart from one another about the axis of rotation of said rotatable means.

3. The assembly of claim 2 including a plurality of positioning pins respectively disposed within said springs and connected with at least one of said second and third rings.

4. The assembly of claim 3 wherein each of said second and third rings has a plurality of apertures therein and opposite ends of said positioning pins are respectively disposed in said apertures.

5. The assembly of claim 4 including friction-reducing means attached to said third ring and abutting said second surface of said rotatable means.

6. The assembly of claim 5 wherein a plurality of recesses are spaced apart from one another about the side of said third ring facing said second surface of said rotatable means and said friction-reducing means comprises pads (1) formed of a material having a low coefficient of friction, and (2) seated in and projecting from said recesses.

7. An assembly comprising:
    a tube mounted for rotation about its longitudinal axis and having first and second flanges fixedly connected thereto and projecting radially outward from the periphery thereof, said flanges being spaced apart longitudinally of said tube;
    a first ring one side of which slidably abuts the side of said first flange nearest said second flange, the other side of said first ring having a recess extending around the outer edge thereof;
    a second ring abutting the side of said first ring nearest said second flange and projecting radially outward therefrom;
    a third ring disposed between said second ring and said second flange;
    means disposed between said second and third rings for resiliently urging them apart;
    a fourth ring disposed in said recess in said first ring and attached to said second ring; and
    a flexible wall having an aperture therein, the portion of said wall adjacent said aperture being attached to said second ring and said wall projecting radially away from said tube.

8. The assembly of claim 7 including a fifth ring positioned around said fourth ring and attached to said second ring, said flexible wall being clamped between said second and fifth rings.

9. The assembly of claim 7 wherein said means for urging said second and third rings apart comprises a plurality of helical springs spaced apart from one another about said tube.

10. The assembly of claim 9 wherein each of said second and third rings has a plurality of apertures therein and including a plurality of positioning pins respectively disposed within said springs with their opposite ends respectively disposed in said apertures.

11. The assembly of claim 10 wherein a plurality of recesses are spaced apart from one another about the side of said third ring facing said second flange, and including a plurality of graphite pads respectively seated in said recesses and projecting therefrom to engage said second flange.

* * * * *